United States Patent
Draak et al.

(10) Patent No.: US 12,368,375 B2
(45) Date of Patent: Jul. 22, 2025

(54) WIRELESS POWER TRANSFER

(71) Applicant: KONINKLIJKE PHILIPS N.V., Eindhoven (NL)

(72) Inventors: Johannes Wilhemus Draak, Horst (NL); Wilhelmus Gerardus Maria Ettes, Leeuwarden (NL); Klaas Jakob Lulofs, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/562,891

(22) PCT Filed: May 19, 2022

(86) PCT No.: PCT/EP2022/063510
§ 371 (c)(1),
(2) Date: Nov. 21, 2023

(87) PCT Pub. No.: WO2022/248322
PCT Pub. Date: Dec. 1, 2022

(65) Prior Publication Data
US 2024/0266951 A1 Aug. 8, 2024

(30) Foreign Application Priority Data
May 26, 2021 (EP) .................... 21175922

(51) Int. Cl.
*H02J 50/00* (2016.01)
*H02J 50/12* (2016.01)
(Continued)

(52) U.S. Cl.
CPC ............ *H02M 3/015* (2021.05); *H02J 50/12* (2016.02); *H02J 50/80* (2016.02)

(58) Field of Classification Search
None
See application file for complete search history.

(56) References Cited

U.S. PATENT DOCUMENTS

| 9,843,226 B2 * | 12/2017 | Lee ........................ H02J 50/12 |
| 2010/0081379 A1 * | 4/2010 | Cooper .................... H01Q 7/00 455/41.1 |

(Continued)

FOREIGN PATENT DOCUMENTS

| CN | 103299512 A | 9/2013 |
| EP | 3570410 A1 | 11/2019 |

OTHER PUBLICATIONS

International Search Report and Written Opinion from PCT/EP2022/063510 mailed Sep. 7, 2022.
(Continued)

*Primary Examiner* — Adi Amrany

(57) ABSTRACT

A power transmitter for wirelessly providing power to a power receiver comprises an output circuit comprising a transmitter coil generating a power transfer signal when a drive signal is applied to the output circuit. A load function circuit determines a load function that describes a dependency of a loading of the drive signal by the output circuit on a frequency of the drive signal for the power transmitter and power receiver arrangement. An interval circuit determines two operating frequency ranges separated by a non-operating frequency range in response to the load function. A power controller controls a power level of the power transfer signal by adjusting the frequency of the drive signal over at least frequencies within the operating frequencies while excluding frequencies within the non-operating frequency range.

21 Claims, 15 Drawing Sheets

(51) Int. Cl.
*H02J 50/80* (2016.01)
*H02M 3/00* (2006.01)

(56) References Cited

U.S. PATENT DOCUMENTS

| | | |
|---|---|---|
| 2014/0368053 A1 | 12/2014 | Lee et al. |
| 2014/0368056 A1 | 12/2014 | Hosotani |
| 2015/0162785 A1 | 6/2015 | Lee et al. |
| 2017/0237290 A1 | 8/2017 | Bakker et al. |
| 2017/0256993 A1* | 9/2017 | Nakamura ............... H02J 50/80 |
| 2018/0123399 A1* | 5/2018 | Walton .................... H02J 50/12 |
| 2018/0342878 A1* | 11/2018 | Nagaoka ................. H02J 50/80 |
| 2018/0351391 A1 | 12/2018 | Park |
| 2018/0366984 A1* | 12/2018 | Joye ........................ H02J 50/12 |
| 2019/0089197 A1 | 3/2019 | Mao et al. |

OTHER PUBLICATIONS

QI Specification Authentication Protocol vol. 1.3 Jan. 2021.
Cohen et al "Spherical CNNs" Conference Paper at ICLR 2018.

* cited by examiner

WIRELESS POWER TRANSFER

CROSS-REFERENCE TO PRIOR APPLICATIONS

This application is the U.S. National Phase application under 35 U.S.C. § 371 of International Application No. PCT/EP2022/063510, filed on May 19, 2022, which claims the benefit of EP Patent Application No. EP 21175922.0, filed on May 26, 2021. These applications are hereby incorporated by reference herein.

FIELD OF THE INVENTION

The invention relates to a wireless power transfer system and in particular, but not exclusively, to the operation of a power transmitter providing inductive power transfer to high power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

The Wireless Power Consortium has on the basis of the Qi Specification proceeded to develop the Ki Specification (also known as the Cordless Kitchen Specification) which is aimed at providing safe, reliable, and efficient wireless power transfer to kitchen appliances. Ki supports much higher power levels up to 2.2 KW.

A potential problem with wireless power transfer is that the power transfer performance may depend significantly on the specific conditions. In particular, the power transfer performance in terms of efficiency, achievable power levels, adaptation response times, etc., tend to depend heavily properties of the power transmitter and the power receiver such as sizes, induction values and loads and these may vary very substantially between different devices. The power transfer operation may also depend substantially on how the transmitter coil and the receiver coil are positioned relatively to each other. In general, more efficient and reliable power transfer tends to be achieved for the coils aligning and being closer to each other. Typically, the power transfer performance depends on the coupling factor or coefficient and the higher the coupling factor the more efficient the power transfer.

Thus, the power transfer operation depends substantially on the specific power transmitter and power receiver arrangement including both parameters of the power transmitter and of the power receiver, as well as of the specific scenario of the operation such as the relative positioning of the power transmitter and the power receiver.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The power receiver sends this error signal to the power control function in the power transmitter to reduce the static error, ideally to zero. In many systems, the power transmitter may control the power level by varying a frequency, amplitude level and/or duty cycle of the power transfer signal. Examples of wireless power transfer systems using frequency variation to control the power level are disclosed in US 2019/089197A1 and CN 103 299 512A.

However, the efficient operation of such a power control loop is very challenging and difficult when the power transfer properties of the systems may vary substantially. In particular when frequency control is used to adapt the power transfer levels, an efficient power control operation is difficult to achieve. Many approaches will tend to result in suboptimal and/or more complex operation and control for some scenarios and power transfer arrangements.

Hence, an improved operation for a power transfer system would be advantageous and, in particular, an approach allowing increased flexibility, reduced cost, reduced complexity, improved power control operation, improved adaptation to load changes and/or variations in the operating conditions, backwards compatibility, improved suitability for higher power level transfers, improved power transfer, improved adaptation to specific operating conditions, and/or an improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal, the power transmitter comprising: an output circuit comprising a transmitter coil arranged to generate the inductive power transfer signal in response to a drive signal being applied to the output circuit; a driver arranged to generate the drive signal; a load function circuit arranged to determine a load function for the power transmitter and power receiver arrangement, the load function describing a dependency of a load provided to the drive signal by the output circuit on a frequency of the drive signal for the power transmitter and power receiver arrangement; a power controller for controlling a power level of the inductive power transfer signal by adjusting the frequency of the drive signal; an interval circuit for determining a first operating frequency range and a second operating frequency range separated by a non-operating frequency range in response to the load function; wherein the power controller is arranged to adapt the power level of the inductive power transfer signal by varying the frequency of the drive signal over at least frequencies within the first operating frequency range and the second operating frequency range and excluding frequencies within the non-operating frequency range.

The invention may provide improved performance in many embodiments and may in particular in many embodiments provide improved power control for a wireless power transfer. The approach may in many embodiments facilitate power control and allow for a lower complexity operation. The approach may in many embodiments allow improved power control and may for example in many embodiments allow an improved power level range, smoother power control, improved driving of the output circuit (e.g. using zero voltage switching), reduced transients, reduced over power, and/or reduced over voltage.

The approach may in particular allow improved power control for systems where the parameters of the power transfer may vary substantially. In particular, the Inventors have realized that e.g. for power transfer systems using resonant coupling (with the power transmitter coil and/or the power receiver coil being part of resonance circuits), a power transfer dependency on frequency may often include different behavior in different frequency ranges and by selectively restricting power control to a subset of frequency ranges, a substantially improved performance may often be achieved.

In some embodiments, the load function may be or comprise a power transfer function (which may be indicative of a level of power transferred to the power receiver as a function of the frequency of the drive signal), a transfer power load (which may be indicative of a loading of the driver/drive signal caused by power transfer as a function of the frequency of the drive signal), a power loading (which may be indicative of a loading of the driver/drive signal by the output circuit as a function of frequency of the drive signal), and/or a load impedance of the output circuit (which may be indicative of an impedance of the output circuit as a function of frequency of the drive signal). In some embodiments, the load function may be or include a load phase function (which may be indicative of a phase offset between current and voltage for the output circuit and/or the drive signal as a function of frequency).

The load function may be indicative of a load of the driver. The load function may describe the load of an output of the driver generating the drive signal/providing the drive signal to the output circuit. The load may be an impedance of the output circuit presented to an output of the driver generating the drive signal.

The power level ranges for the power transfer signal for the first and second operating frequency ranges may be different. In many embodiments, a maximum power level for the power transfer signal for the first operating frequency range may be higher than a maximum power level for the power transfer signal for the second operating frequency range and a minimum power level for the power transfer signal for the second operating frequency range may be lower than a minimum power level for the power transfer signal for the first operating frequency range (or vice versa).

The power controller may be arranged to reduce a power level of the power transfer signal by changing the frequency of the drive signal from a frequency of the first operating frequency range to a frequency of the second operating frequency range without the frequency of the drive signal being a frequency of the non-operating frequency range. The power controller may be arranged to increase a power level of the power transfer signal by changing the frequency of the drive signal from a frequency of the first operating frequency range to a frequency of the second operating frequency range without the frequency of the drive signal being a frequency of the non-operating frequency range.

In accordance with an optional feature of the invention, the interval circuit is arranged to determine the first operating frequency range and the second operating frequency range in response to a reactive component of an impedance of the output circuit as a function of the frequency of the drive signal.

This may provide improved performance and/or operation in many embodiments. In particular, it may for example allow improved driving, such as when using zero voltage switching. The load function may be indicative of the reactive component of the impedance of the output circuit as a function of the frequency of the drive signal.

In accordance with an optional feature of the invention, the interval circuit is arranged to determine the first operating frequency range and the second operating frequency range to be frequency ranges for which the impedance of the output circuit has an inductive reactance and for the non-operating operating frequency range to include frequencies for which the output circuit has a non-inductive impedance.

This may provide improved performance and/or operation in many embodiments. In particular, it may for example allow improved driving, such as when using zero voltage switching. The load function may be indicative of the reactive component of the impedance of the output circuit as a function of the frequency of the drive signal.

In accordance with an optional feature of the invention, the interval circuit is arranged to determine the first operating frequency range and the second operating frequency range such that a transfer power load for an upper frequency of the first operating frequency range matches a transfer power load for a lower frequency of the second operating frequency range.

This may provide improved performance and/or operation in many embodiments. In particular, it may provide reduced transition effects when switching between the operating frequency ranges. In many embodiments, it may in particular reduce electromagnetic interference when substantially changing the drive frequency.

The interval circuit may be arranged to determine that the transfer power loads for the frequencies match if they meet a match or similarity criterion. For example, it may be considered that the transfer power loads match if they differ by no more than 1%, 2%, 5%, or 10%. In some embodiments, the match criterion may be that the transfer power loads are as close to each other as possible subject to other specific constraints being met.

The interval circuit may in some embodiments be arranged to determine the operating frequency ranges such that the transition frequencies correspond to a highest power level for which a match occurs. The interval circuit may in some embodiments be arranged to determine the operating frequency ranges such that the transition frequencies correspond to a lowest power level for which a match occurs.

The transfer power load may be indicative of a level of power for the loading of the drive signal by the output circuit and/or the power receiver.

In accordance with an optional feature of the invention, the interval circuit is further arranged to determine the first operating frequency range and the second operating frequency range in response to a gradient of the load function for the upper frequency of the first operating frequency range and a gradient of the load function for the lower frequency of the second operating frequency range.

This may provide improved performance and/or operation in many embodiments. In particular, it may provide reduced transition effects when switching between the operating frequency range. In many embodiments, it may in particular reduce electromagnetic interference when substantially changing the drive frequency.

In accordance with an optional feature of the invention, the interval circuit is arranged to determine the first operating frequency range and the second operating frequency range in response to a gradient of the load function as a function of the frequency of the drive signal.

This may provide improved performance and/or operation in many embodiments. In particular, it may provide reduced transition effects when switching between the operating frequency range. In many embodiments, it may in particular reduce electromagnetic interference when substantially changing the drive frequency.

In accordance with an optional feature of the invention, the interval circuit is arranged to determine the first operating frequency range and the second operating frequency range such that the load function is monotonic for frequencies of the first operating frequency range and the second operating frequency range.

This may provide improved performance and/or operation in many embodiments. It may in particular in many embodiments provide a smoother and/or facilitated power control.

In many embodiments, the load function may be non-monotonic for at least some frequencies of the non-operating frequency range.

In accordance with an optional feature of the invention, the load function is monotonically decreasing for increasing frequencies of the first operating frequency range and the second operating frequency range.

This may provide improved performance and/or operation in many embodiments.

In accordance with an optional feature of the invention, the interval circuit is arranged to determine the load function in response to measurements of a property of the drive signal while varying the frequency of the drive signal.

This may provide improved performance and/or operation in many embodiments.

In accordance with an optional feature of the invention, the driver is arranged to generate the drive signal to apply a repeating time frame to the power transfer signal comprising at least one power transfer interval during which the power transfer signal is arranged to transfer power to the power receiver and at least on reduced power time interval during which a power of the power transfer signal is reduced relative to the power transfer interval; and wherein the power controller is arranged to only change the frequency of the drive signal outside power transfer intervals.

This may provide improved performance in many scenarios and may in particular reduce electromagnetic interference in many embodiments.

The repeating time frame may be a periodic time frame. The repeating time frame may have a fixed or variable repetition frequency/period. The power transfer signal may be active/on during power transfer time intervals and inactive/off during reduced power time intervals.

In some embodiments, no power transfer signal is generated during reduced power time intervals.

In accordance with an optional feature of the invention, the driver is arranged to generate the drive signal to apply a repeating time frame to the power transfer signal comprising at least one power transfer interval during which the power transfer signal is arranged to transfer power to the power receiver and at least on reduced power time interval during which a power of the power transfer signal is reduced relative to the power transfer interval; and the power controller is arranged to only change the frequency of the drive signal either within the first operating frequency range or within the second operating frequency range during one power transfer time interval.

This may provide improved performance in many scenarios and may in particular reduce electromagnetic interference in many embodiments while allowing improved power control.

The power controller may be arranged to only change the frequency of the drive signal between the first operating frequency range and the second operating frequency range when the drive signal is not in a power transfer time interval. The power controller may be arranged to change the frequency of the drive signal between the first operating frequency range and the second operating frequency range only when the drive signal is not in a power transfer time interval.

The repeating time frame may be a periodic time frame. The repeating time frame may have a fixed or variable repetition frequency/period. The power transfer signal may be active/on during power transfer time intervals and inactive/off during communication time intervals.

In some embodiments, no power transfer signal is generated during reduced power time intervals.

In accordance with an optional feature of the invention, the power controller is arranged to adapt the power level by reducing a duty cycle of the drive signal during at least one of a power up interval at a start of a power transfer time interval and a power down interval at an end of the power transfer time interval.

This may provide improved performance and/or operation in many embodiments.

According to an aspect of the invention there is provided a method of operation for a power transmitter for wirelessly providing power to a power receiver via an inductive power transfer signal, the power transmitter comprising: an output circuit comprising a transmitter coil arranged to generate the inductive power transfer signal in response to a drive signal being applied to the output circuit; and the method comprising: generating the drive signal; determining a load function for the power transmitter and power receiver arrangement, the load function describing a dependency of a load provided to the drive signal by the output circuit on a frequency of the drive signal for the power transmitter and power receiver arrangement; controlling a power level of the inductive power transfer signal by adjusting the frequency of the drive signal; determining a first operating frequency range and a second operating frequency range separated by a non-operating frequency range in response to the load function; wherein controlling the power level comprises adapting the power level of the inductive power transfer signal by varying the frequency of the drive signal over at least frequencies within the first operating frequency range and the second operating frequency range and excluding frequencies within the operating frequency range.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi Specification or the Ki Specification. However, it will be appreciated that the invention is not limited to this application but may be applied to many other wireless power transfer systems.

Figure 1:
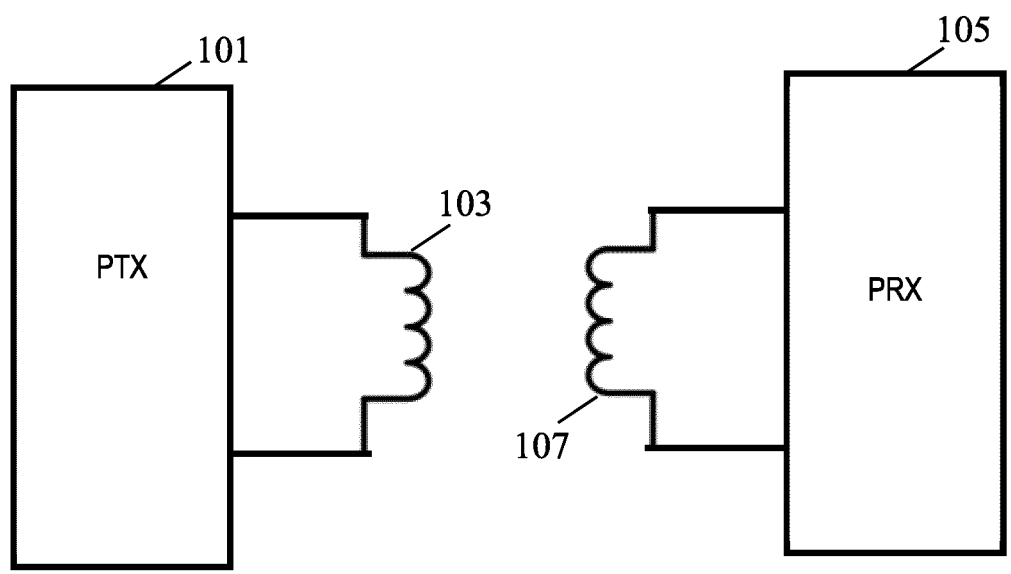
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz or for Ki compatible systems typically in the range between 20 kHz to 80 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the baseline power profile), up to 15 W for Qi specification version 1.2, in the range up to 100 W for higher power applications such as power tools, laptops, drones, robots etc., and in excess of 100 W and up to more than 2000 W for very high power applications, such as e.g. for Ki kitchen applications.

In the following, the operation of the power transmitter 101 and the power receiver 105 will be described with specific reference to an embodiment generally in accordance with the Qi or Ki Specifications (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1, 1.2 or 1.3 (except for the herein described (or consequential) modifications and enhancements).

Many wireless power transfer systems, and in particular high power systems such as Ki, utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

In most power transfer systems, before power transfer is initiated, a communication channel between the power transmitter 101 and the power receiver 105 is established. When the communication has been set up and identification of the two devices has been achieved, the power transmitter 101 may start power transmission to the power receiver 105.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The appliance sends this error signal to the power control function in the power transmitter to reduce the static error, ideally to zero.

Figure 2:
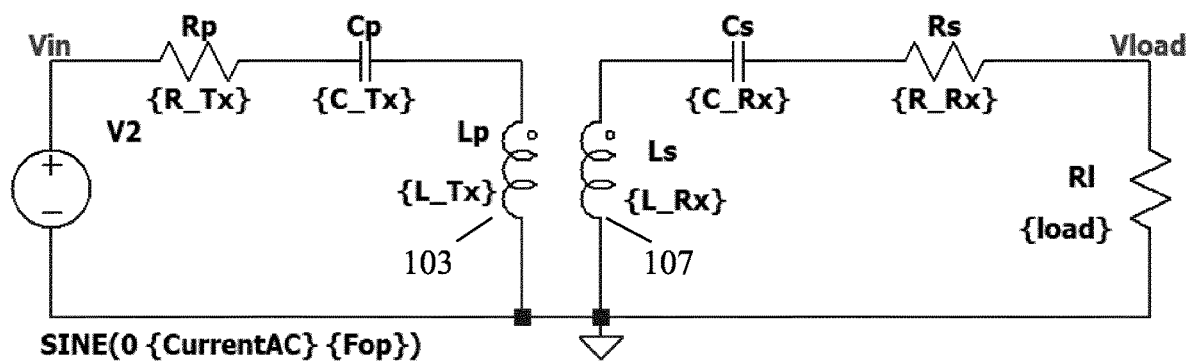
FIG. 2 illustrates an example of an electrical equivalence diagram for power transfer in the power transfer system of FIG. 1.

An example of an electrical equivalence diagram for the power transfer function of the power transmitter 101 and the power receiver 105 is illustrated in FIG. 2. A wide range of power transmitters and power receivers may exist in a given system and these may have substantially different properties and parameters. For example, the coil sizes, induction values, and loads may vary substantially. Accordingly, the system parameters, as specifically represented in FIG. 2, may in practice vary significantly between different devices, mechanical constructions, positioning etc. In particular, the placement of the power receiver, and thus the relative positions of the receiver coil 107 and the transmitter coil 103, substantially affects the coupling between the coils, i.e. the primary (power transmitter side) inductor Lp and the secondary (power transmitter side) inductor Ls, and thus may significantly change the system behavior.

Furthermore, the power receiving devices may have several different modes in which they operate, such as for example with several loads being switched on or off in different modes. For example, for the power receiver being an air fryer appliance, the heating element can be turned on and off. This may e.g. results in a very substantially load step from, say, 50 to 1200 W and vice versa. Further, such load switching may be repeated during operation of the device to keep the temperature constant.

Systems can also contain non-linear loads, e.g. rather than a resistive component, the power receiver may drive a motor, such as e.g. a motor of a food processor. This results in a completely different response of the system and this has a large impact on specifically the control system design.

A wireless power transfer system may employ a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The appliance sends this error signal, or possibly the desired power setpoint, to the power control function in the power transmitter to reduce the static error, ideally to zero.

However, since the system performance and operation vary greatly depending on the existing power transmitter and power receiver combination and placements, the appropriate operating point also varies greatly.

Figure 3:
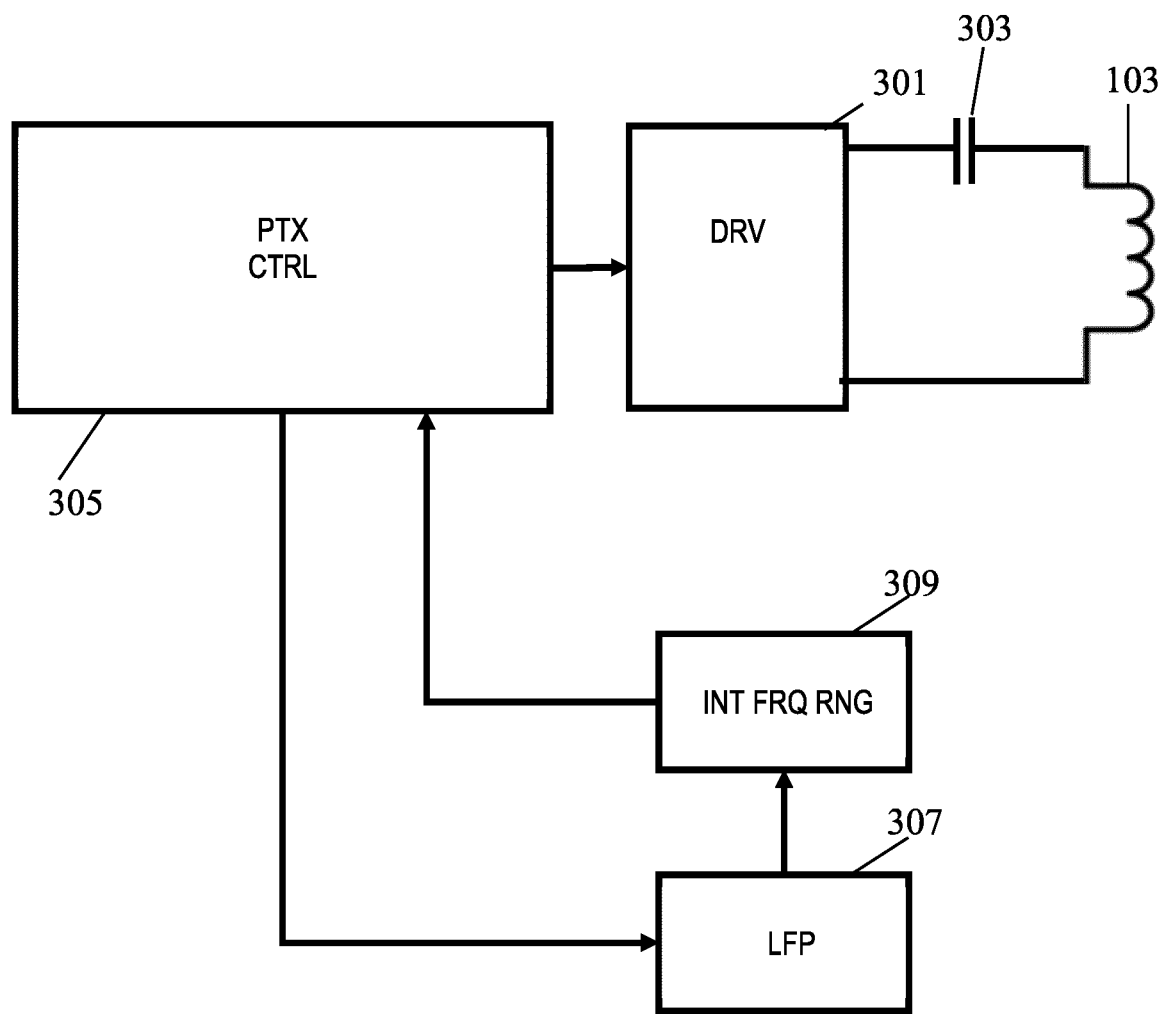
FIG. 3 illustrates an example of elements of a power transmitter in accordance with some embodiments of the invention.

FIG. 3 illustrates elements of the power transmitter 101 of FIG. 1 in more detail.

The power transmitter 101 includes a driver 301 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 303. In the example, the output resonance circuit is a series resonance circuit, but it will be appreciated that in other embodiments, the output resonance circuit may be a parallel resonance circuit. It will be appreciated that any suitable resonance circuit may be used including one including multiple inductors and/or capacitors. It will be appreciated that the output circuit 103, 303 in some embodiments may also include additional components (such as e.g. a current or voltage sensor component) The driver 301 generates the current and voltage which is fed to the output resonance circuit and thus to the transmitter coil 103. The drive signal causes current through the transmitter coil 103 resulting in an electromagnetic power transfer signal being generated.

Figure 4:
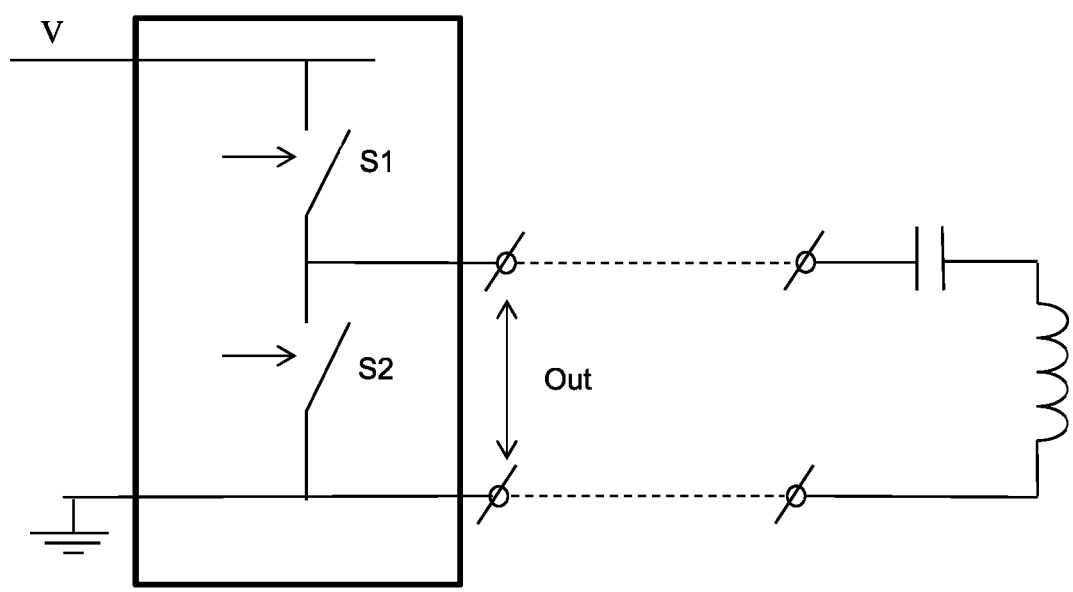
FIG. 4 illustrates an example of a half bridge inverter for a power transmitter.
Figure 5:
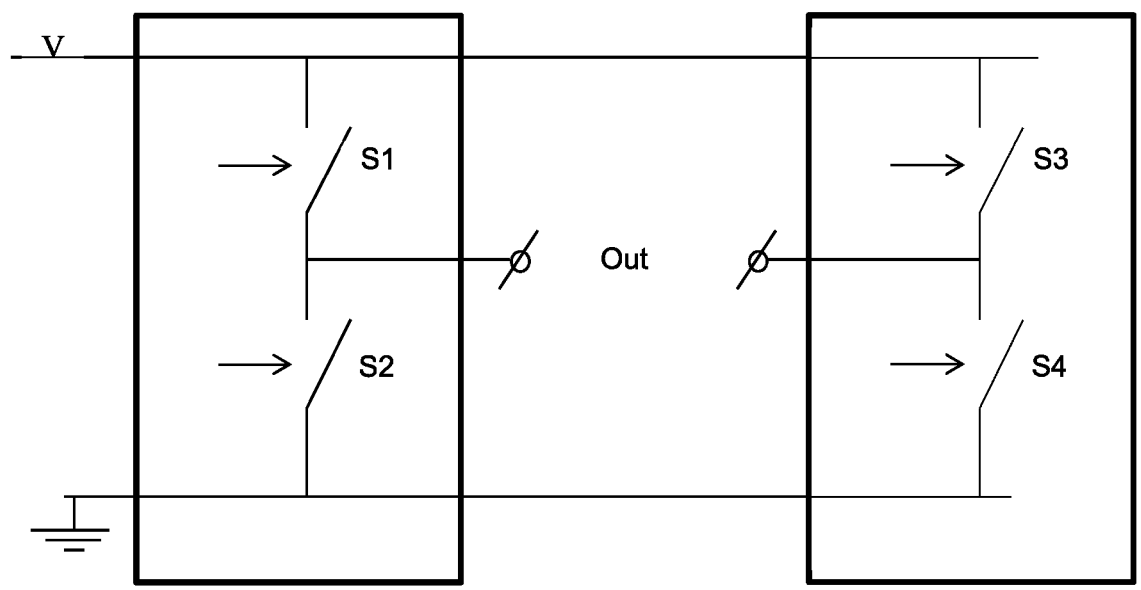
FIG. 5 illustrates an example of a full bridge inverter for a power transmitter.

The driver 301 is typically a drive circuit in the form of an inverter which generates an alternating signal from a DC Voltage. The output of the driver 301 is typically a switch bridge generating the drive signal by the appropriate switching of switches of the switch bridge. FIG. 4 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 5 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 305 which is arranged to control the operation of the power transmitter 101 in accordance with the desired operating principles. Specifically, the power transmitter 101 may include many of the functionalities required to perform power control in accordance with the Qi Specification or the Ki Specification.

The power transmitter controller 305 is in particular arranged to control the generation of the drive signal by the driver 301, and it can specifically control the power level of the drive signal, and accordingly the level of the generated power transfer signal. The power transmitter controller 305 comprises a power loop controller controlling a power level of the power transfer signal in response to the power control messages received from the power receiver 105 during the power transfer phase.

The power transmitter controller 305 may further comprise functionality for communicating with the power receiver 105. For example, the power transmitter controller 305 may be arranged to transmit data to the power receiver 105 by modulating the power transfer signal and receive data from the power receiver 105 by detecting load modulation of the power transfer signal. It will be appreciated that in other embodiments, other means of communication may be used such as e.g. a separate communication functionality such as NFC communication may be implemented.

The use of a resonance circuit including the transmitter coil 103 is well known to provide a more efficient power transfer in many scenarios. Furthermore, having a power receiver which also employs a resonance circuit, i.e. where the receiver coil 107 is part of a resonance circuit, may result in resonant power transfer that provides a number of advantages including a highly efficient power transfer and facilitated control of the power transfer, such as e.g. by controlling the frequency of the drive signal.

Figure 6:
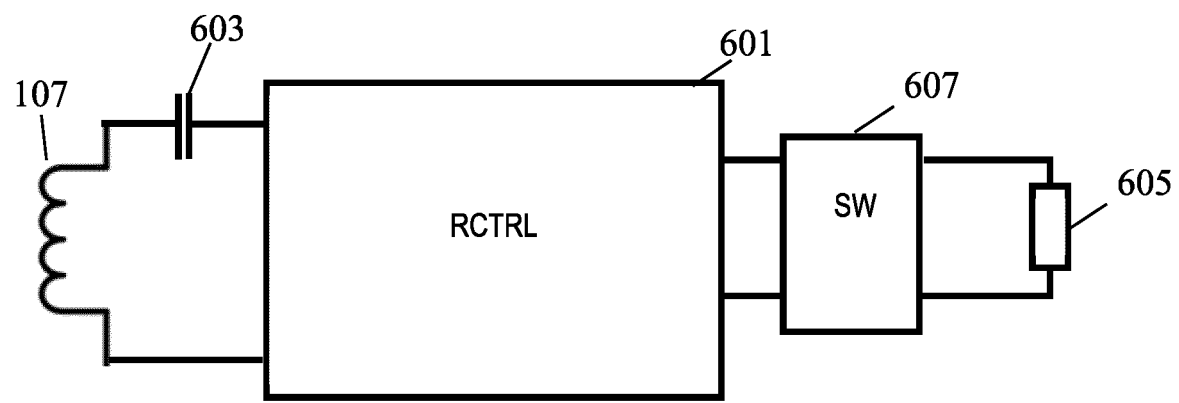
FIG. 6 illustrates an example of elements of a power receiver in accordance with some embodiments of the invention.

FIG. 6 illustrates some exemplary elements of the power receiver 105.

The receiver coil 107 is coupled to a power receiver controller 601 via a capacitor 603 which together with the receiver coil 107 forms an input resonance circuit. Thus, the power transfer may be a resonant power transfer between resonance circuits.

The power receiver controller 601 couples the receiver coil 107 to a load 605 via a switch 607 which specifically may be capable of shorting the load 605. The power receiver controller 601 includes a power control path which converts the power extracted by the receiver coil 107 into a suitable supply for the load 605. In some embodiments, the power receiver controller 601 may provide a direct power path which simply connects the input resonance circuit to the switch 607 or load 605, i.e. the power path of the power receiver controller 601 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 607 may only be present in some embodiments and that in some embodiments the load 605 may permanently be coupled to the input resonance circuit.

In addition, the power receiver controller 601 may include various power receiver controller functionality required to perform power transfer, and in particular functions required to perform power transfer in accordance with the Qi or Ki Specifications.

The power receiver controller 601 may further comprise functionality for communicating with the power transmitter 101. For example, it may be arranged to decode and demodulate data modulated onto the power transfer signal and it may be arranged to transmit data to the power transmitter 101 by load modulating the power transfer signal. In some embodiments, a separate communication function, such as an NFC communication function may be employed.

In operation, the system is arranged to control the drive signal such that the power transfer signal attains suitable operating parameters/properties, and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

At regular, and typically frequent, intervals, the power receiver transmits a power control error message to the power transmitter. In some embodiments, a direct power setpoint change message may be transmitted indicating a desired absolute power level (rather than a relative error message). The power receiver 105 comprises functionality for supporting such a power control loop, e.g. the power receiver controller 601 may continuously monitor the power or voltage of a load signal provided to the load and detect whether this is above or below a desired value. It may at regular intervals generate a power control error message which requests that the power level of the power transfer signal is increased or decreased, and it may transmit this power control error message to the power transmitter.

When receiving a power control error message from the power receiver, the transmit controller 305 may determine how the drive signal parameter should be modified to increase or decrease the power level of the power transfer signal as requested. It may then control and adapt the drive signal parameter accordingly.

A power control loop is accordingly employed which controls a power property of the power transfer signal to result in the desired operating point at the power receiver. The operation of the power transfer is thus controlled by a power control loop and the effective operation of this is critical to the performance of the system. Initializing or adapting the power control loop to the operation conditions is thus critical for optimum performance.

In many systems the power adaptation is fully or partly achieved by adapting the frequency of the drive signal and power transfer signal. Especially when using resonance coupled power transmitter output circuits and power receiver input circuits, i.e. with the transmitter coil 103 and the receiver coil 107 being part of respective resonance circuits, varying the frequency of the drive signal provides a very efficient and implementation friendly approach for adapting the power level being transferred.

However, whereas such an approach of adjusting the frequency may have a number of advantages, the Inventors have realized that it also has disadvantages and that effective and accurate control may be difficult to achieve in some scenarios. The Inventors have further realized that improved performance can be achieved in many systems and scenarios by adapting the frequency within suitable disjoint operating frequency ranges that are separated by a non-operating frequency range which is excluded such that the drive signal will not be allocated frequencies within this detail.

Figure 7:
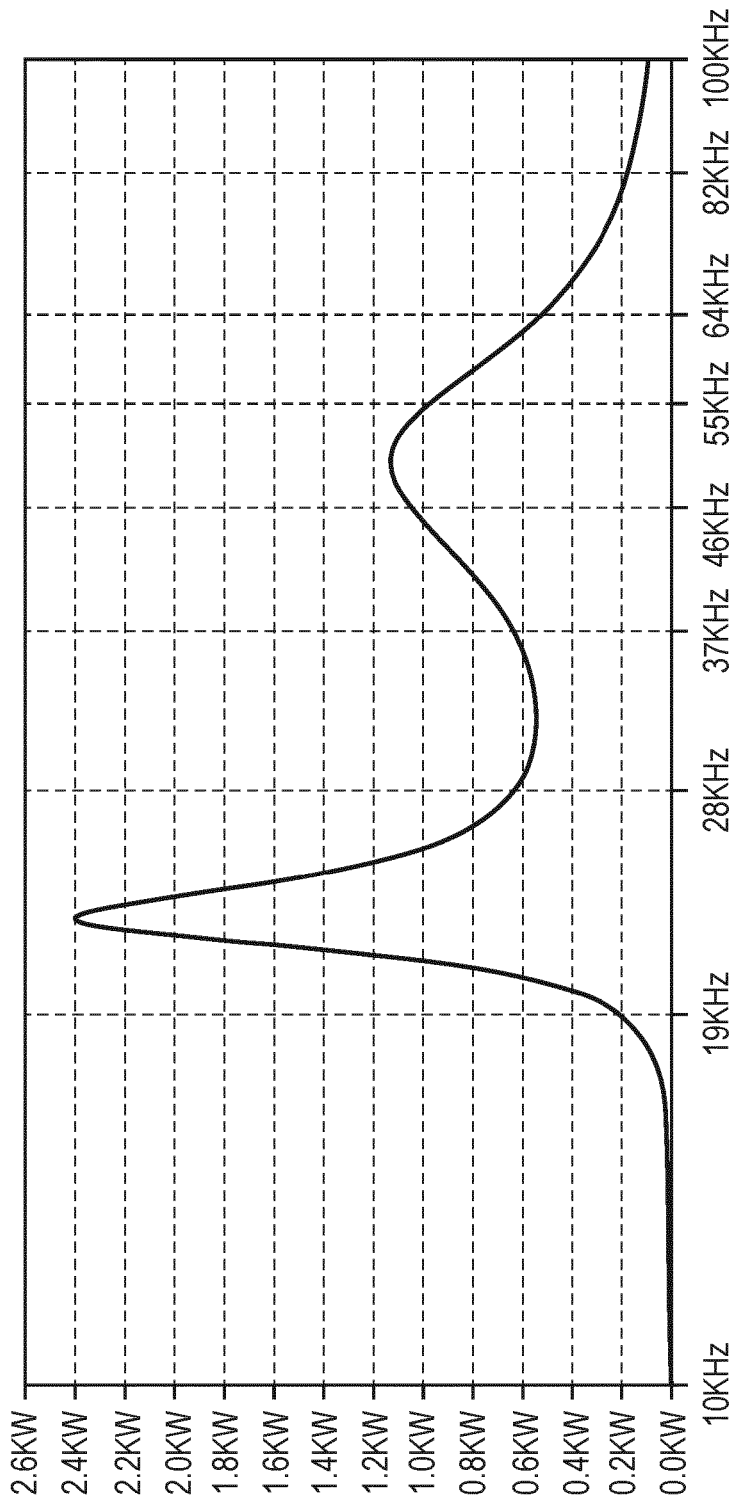
FIG. 7 illustrates in example of load functions for the power transfer system of FIG. 1.

In particular, it has been found that highly irregular, non-monotonic, and/or non-linear relationships between power transfer and drive signal frequency may often occur with more than one resonance frequency in the system and with a highly varying characteristics being present between the resonance frequencies. FIG. 7 illustrates an example of a possible power transfer function that may be encountered. The shape of the function is one that may often be encountered in practical wireless power transfer systems.

However, such power transfer functions may be difficult to control and in particularly it may be challenging to accurately operate the power control loop such that smooth, efficient, and reliable power adaptation is achieved. Such issues are typically exacerbated when the transfer functions are non-monotonic and possibly non-linear.

For example, in an example such as FIG. 7 where the system has two different resonance peaks, it may sometimes be necessary to control the frequency to be close to the lower frequency peak in order to achieve the desired power levels (for example to reach 2.2 kW it may be necessary to control the frequency to be close to the lower frequency peak). However, at other times, it may be desirable or even necessary to control the frequency to be higher than the second (higher frequency) peak in order to reduce the power levels to sufficiently low values and with sufficient accuracy. However, due to the non-monotonic relationships which is further dependent on the specific operating conditions and which may vary substantially, the control may be suboptimal. For example, when increasing the frequency from being close to the first resonant peak to being higher than the second resonance peak, the system sweeps through the second peak itself, this can cause undesirable performance such as over-voltages or over-currents at the power receiver as power increases as part of this sweep over the second peak.

The power transmitter of FIG. 3 may be arranged to provide improved operation and/or implementation in many scenarios and may often avoid, improve, reduce and/or mitigate disadvantages as described in the previous paragraphs.

The power transmitter of claim 3 comprises load function circuit 307 which is arranged to determine a load function for the current power transmitter and power receiver arrangement where the load function reflects how the loading of the drive signal by the output circuit depends on the frequency of the drive signal for the current power transmitter and power receiver arrangement.

The load may be a load of the driver. The load may be a load of an output of the driver generating the drive signal/providing the drive signal to the output circuit. The load may be the load of the output circuit experienced by an output of the driver providing the drive signal to the output circuit. A load of a signal may be a load of an output generating/providing the signal. The load may be an impedance. The load may be an impedance of the output circuit. The load and/or loading of the drive signal by the output circuit may be a property/characteristic of a power provided to the output circuit The power may be a complex power including both an active power component and a reactive power component. The load may be indicative of an active power, a reactive power, and/or an apparent power being provided/transferred to the output circuit by the drive signal.

The power transmitter and power receiver arrangement may include parameters and characteristics of the power transmitter and the power receiver individually, such as component values etc. Such parameters and characteristics may be static. The power transmitter and power receiver arrangement may further include parameters and characteristics of the interaction between the power transmitter and power receiver for the current scenario/situation/arrangement. Such parameters and characteristics may include the relative position and e.g. coupling between the power transmitter and power receiver. Such parameters and characteristics may typically be dynamic and may be different for different power transfers between the same power transmitter and power receiver. The load provided by the output circuit to the drive signal and driver depends on the power receiver and on how this is coupled to the transmitter coil 103 (including relative position, coupling parameters etc.). Thus, although the load may be determined at the power transmitter and although it is an internal power transmitter parameter (the coupling between the driver and the output circuit), the load is dependent on and reflect the power transmitter and power receiver arrangement.

The load function thus reflects the changes in the loading that occurs when the frequency of the drive signal, and thus the power transfer signal, changes. In many embodiments, the load function may be a load power function that is indicative of the power being extracted by the output circuit 103, 303 from the drive signal and thus from the driver 301.

In many embodiments, the load power function may specifically be a power transfer function indicative of a level of power being transferred to the power receiver by the power transfer signal, and may specifically be a load power level function indicative of a level of power being provided to the load 605 of the power receiver.

In a resonant system employing a resonant circuit at the output of the power transmitter to generate the power transfer signal, and/or a resonant circuit for extracting power from the power transfer signal by the power receiver, the power level being transferred depends on the frequency of the drive signal and the power transfer signal. Accordingly, the power level that is provided to the load 605 may depend on the drive signal frequency and consequently so may the power being extracted from power receiver input circuit, the power transfer signal, the power transmitter output circuit, the drive signal, and the drive respectively. Thus, each of these may vary as a function of the frequency and the load function may represent one, more, or indeed all of these power levels and loads.

However, the dependency on the drive signal frequency and the power transfer signal frequency is not limited to the power signal but will also extend to other parameters, such as the drive signal current (i.e. the load current extracted by the output circuit 103, 303). Similarly, the current or voltages at the power receiver may depend on the frequency and may accordingly reflect the loading of the drive signal. In some embodiments, the load function may represent such other parameters of the load of the drive signal. Specifically, the load function may be indicative of a variation of a current and/or voltage parameter for the drive signal as a function of the frequency for the specific power transmitter and power receiver arrangement. The power level of the drive signal as a function of the frequency may be an example of a load function that reflects a variation of a current and voltage parameter as a function of a frequency (bearing in mind that the power is determined by the voltage and current).

In many embodiments, the load function may be indicative of a phase difference between the voltage and current of the drive signal, or possibly of an induced signal at the power receiver, as a function of the frequency. The phase difference of the drive signal may for example indicate whether the loading by the output circuit 103, 303 has an inductive reactance or a capacitive reactance.

In some embodiments, the load function may be a multi-dimensional function providing multiple values. For example, the load function may in some embodiments reflect both the power transfer level for the power transfer signal and the phase difference of the drive signal.

The load function circuit 307 may be arranged to determine the load function for the current power receiver and power transmitter arrangement and specifically for the current power transfer operation.

In some embodiments, the load function circuit 307 may be arranged to determine the load function based on calculations or determination from known properties of the power transmitter and power receiver. For example, the load function circuit 307 may have information stored providing the parameters of the power transmitter for the components of the equivalence diagram of FIG. 2. For example, the load function circuit 307 may have information of the inductance of the transmitter coil 103 as well as the capacitance of the resonance capacitor etc. Further, the power receiver may transmit information regarding the parameters of the power receiver, such as the inductance of the receiver coil 107, the resonance capacitor, the load etc. The load function circuit

307 may further estimate or calculate a coupling factor. It may then proceed to analyze the operation of the equivalence circuit to determine a load function. For example, it may determine the load of the output circuit 103, 303 on the driver 201 and the drive signal as a function of frequency.

Thus, in some embodiments, the load function may be extracted from already known system information, i.e. the electric parameters including resonance frequencies, inductances, load values and coupling factors etc. Some of these parameters may possibly be extracted by measurements or compliance testing. These parameters can then be used with already known load function formulas to determine a load function.

In some embodiments, the load function circuit 307 may be arranged to determine the load function in response to measurements of a property of the drive signal while varying the frequency of the drive signal. The load function circuit 307 may perform a frequency sweep over a frequency range and directly measure a parameter of the drive signal. For example, the drive signal frequency may be varied from 20 kHz to 100 kHz and the current and voltage of the drive signal may be measured. The load function circuit 307 may then determine e.g. the phase offset/difference between the voltage and current (and thus the phase of the impedance of the output circuit 103, 303 loading the drive signal) and/or may determine the level of (resistive) power of the drive signal.

In some embodiments, the interval circuit 309 may be arranged to directly evaluate the load function as it is being generated (and thus it need not necessarily by stored). For example, the interval circuit 309 may directly evaluate the drive signal current and voltage during the frequency sweep and may directly detect the frequency intervals for which the impedance of the output circuit 103, 303 is an inductive impedance.

The load function circuit 307 may specifically be arranged to detect the extremes of the load function, such as the lower and higher frequency peaks for the power loading/transfer function, as well as possibly minimum between these.

The load function circuit 307 is coupled to an interval circuit 309 which is fed the load function. The interval circuit 309 is arranged to determine (at least) two operating frequency ranges that are separated by a non-operating frequency range. The interval circuit 309 is arranged to control the power transmitter controller 205 and driver such that the drive frequency (of the drive signal/power transfer signal) is constrained to not fall in the non-operating frequency range. Thus, in the approach, the power transmitter controller 205 is arranged to employ frequency based power control such that the frequencies are limited to operating frequency ranges and excluded from one or possibly more non-operating frequency ranges. Thus, the transmitter coil 103 may vary the drive frequency over an operating range that includes at least a lower frequency range and a higher frequency range, but which excludes a non-operating frequency range that separates the lower and higher frequency ranges.

In some embodiments, the interval circuit 309 may be arranged to determine the first and second operating frequency ranges, and thus the non-operating frequency range, in response to the phase difference between the current and voltage of the drive signal and specifically dependent on whether the phase is positive or negative (and thus e.g. whether the current leads or lags the voltage).

The interval circuit 309 may in some embodiments be arranged to determine the first and second operating frequency ranges, and thus the non-operating frequency range, in response to the phase of the impedance of the output circuit 103, 303 for different frequencies. The interval circuit 309 may in some embodiments be arranged to determine the first and second operating frequency ranges, and thus the non-operating frequency range, in response to the reactive component of the impedance of the output circuit 103, 303 for different frequencies, and specifically in response to the imaginary component of the impedance.

For example, in some embodiments, the impedance of the output circuit 103, 303 may be measured during a frequency sweep with the relative phase difference between the current and voltage of the drive signal being evaluated to determine the phase of the impedance of the output circuit 103, 303. The interval circuit 309 may then proceed to determine the first and second operating frequency ranges as the frequency ranges in which the phase of the impedance is within a predetermined interval.

In some embodiments, the interval circuit 309 may specifically be arranged to determine the first and second operating frequency ranges dependent on whether the impedance has a reactive component that is inductive or non-inductive or capacitive. The interval circuit 309 may determine the impedance as indicated above and may then determine whether the impedance has a phase above or below zero, and thus whether it is a capacitive or inductive reactance. The interval circuit 309 may specifically in some embodiments ignore any resistive component of the impedance.

The phase offset of zero between the voltage and current of the drive signal, and thus the purely resistive loading by the output circuit 103, 303, will tend to coincide with the local minima and maxima of a load function describing a power loading of the drive signal or the power transfer level for the power provided to the power receiver.

The interval circuit 309 may then determine the first operating frequency range and the second operating frequency range to be intervals for which the impedance of the output circuit has an inductive reactance and such that the impedance has a non-inductive impedance for at least some frequencies of the non-operating operating frequency range. The approach may thus ensure that the frequencies of the drive signal are such that the presented load by the output circuit 103, 303 is inductive.

Figure 8:
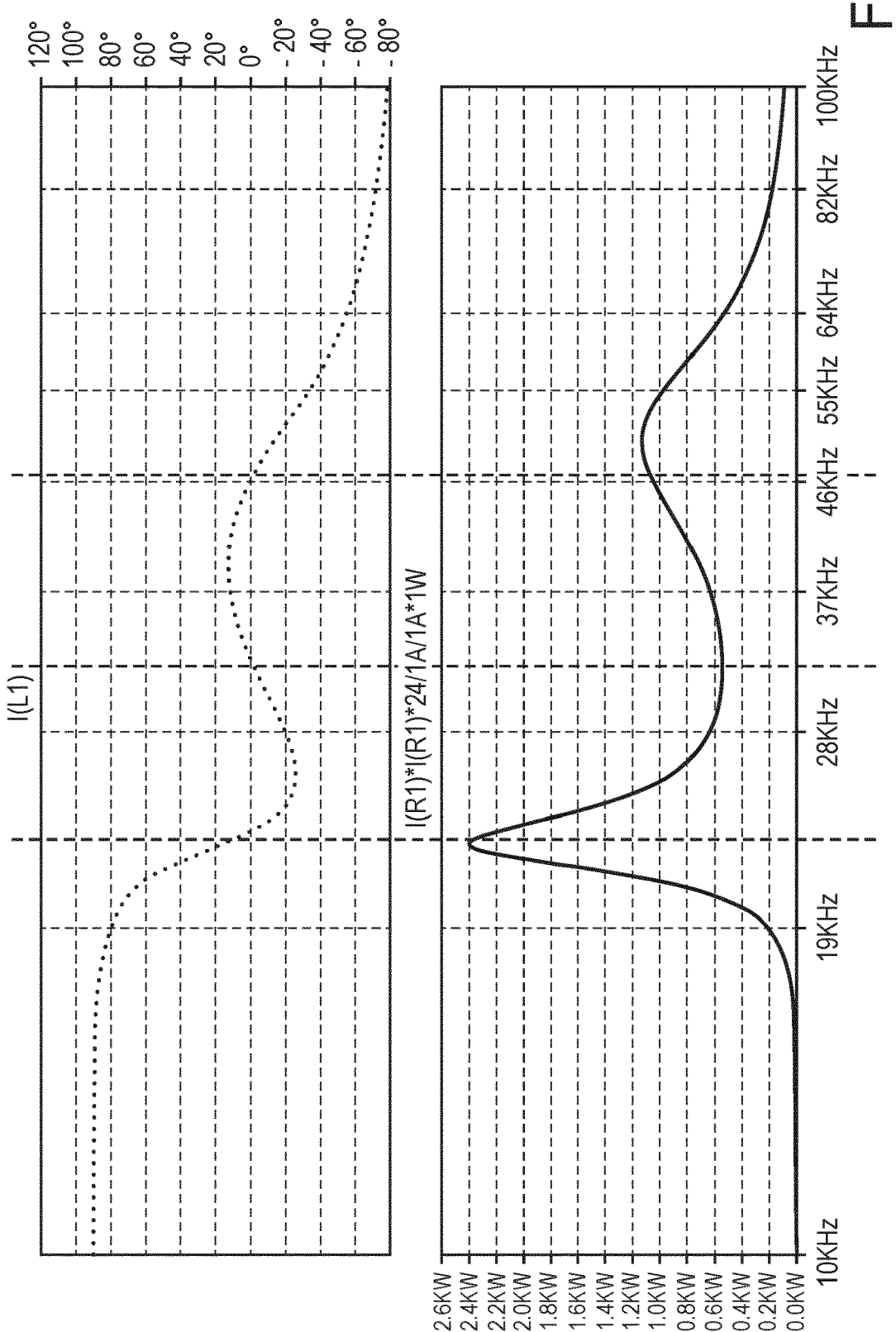
FIG. 8 illustrates in example of load functions for the power transfer system of FIG. 1.

FIG. 8 illustrates an example of a load function that is formed by two separate (partial) load functions which each provide one output value of the load function. Specifically, the first load function provides a phase of the impedance of the output circuit 103, 303 as a function of the frequency of the drive signal, and the second function provides the power transfer level/load power level as a function of the drive signal. It will be appreciated that equivalently, each of the functions can be considered a separate and complete load function.

The interval circuit 309 may for example in some embodiments consider only the impedance phase function and determine the frequency ranges based on the phase of the impedance.

Figure 9:
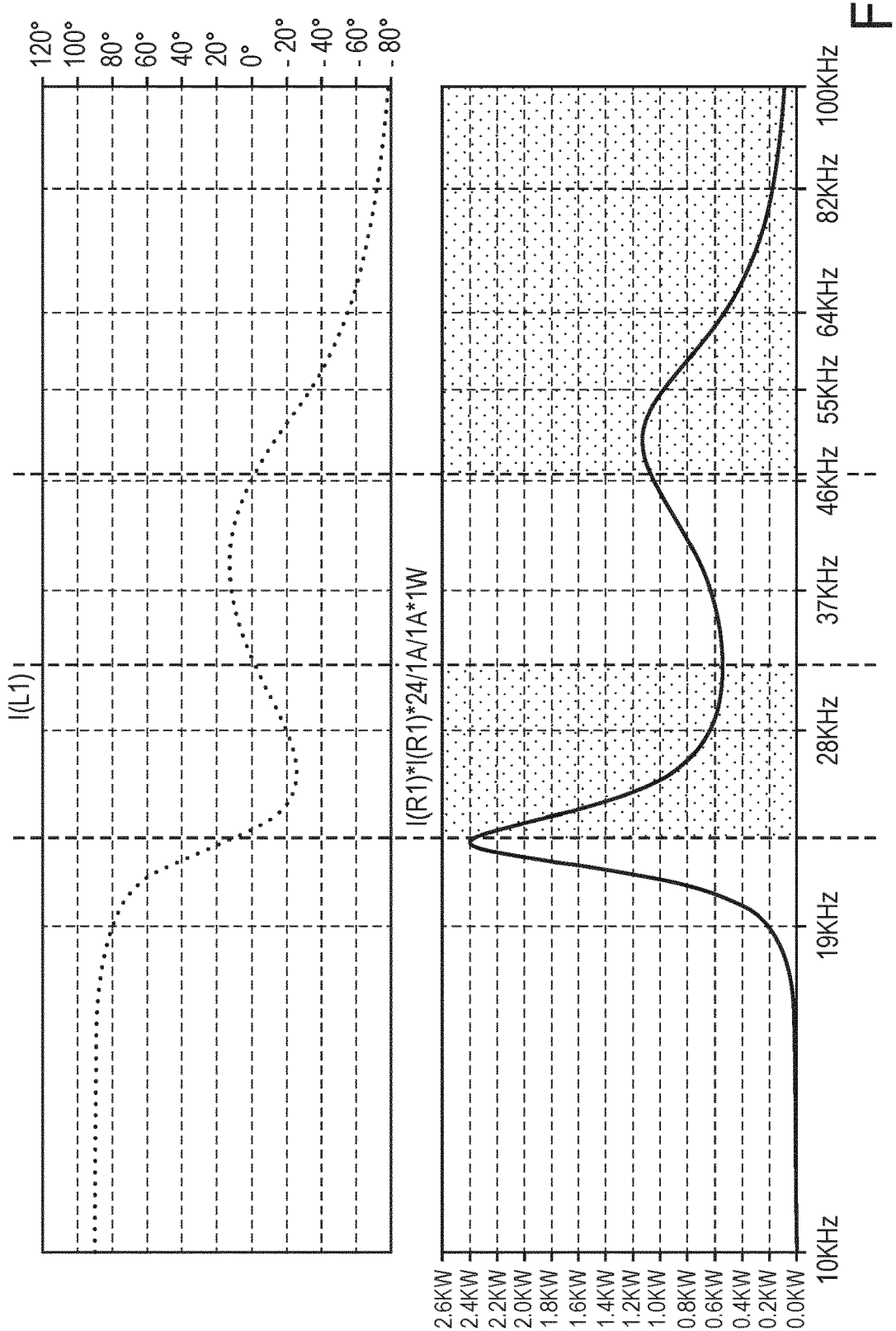
FIG. 9 illustrates in example of load functions for the power transfer system of FIG. 1.

For example, as illustrated in FIG. 8, the interval circuit 309 may determine the frequencies for which the phase is zero, i.e. where the impedance is fully resistive and the phase difference between the current and voltage is zero. In the example of FIG. 8, this may occur at approximately 23 kHz, 32 kHz and 46 kHz. The system may be designed to regulate the power by controlling the drive signal to have frequencies above the first resonance frequency which in the specific example is 23 kHz (coinciding with an impedance that is purely resistive, i.e. having a zero phase). It may then determine the first frequency range as being the range from the first resonance frequency of 23 kHz until the impedance turns capacitive at 32 kHz. It may then determine the second frequency range as the frequency range exceeding the frequency at which the impedance again turns inductive, i.e. as frequencies above 46 kHz. Typically, there will also be an upper range, e.g. given by practical considerations. Thus, the two frequency ranges illustrated in FIG. 9 may be determined as operating frequency ranges with the intervening range (in the example from 32 kHz to 46 kHz) being determined as a non-operating frequency range.

The interval circuit 309 is arranged to provide information of the determined operating frequency ranges to the power transmitter controller 205 which is arranged to control power of the power transfer signal by varying the frequency of the drive signal within the operating frequency ranges while avoiding/excluding the non-operating frequency range. For example, the frequency may initially be set to, say 64 kHz. The power receiver may proceed to request a higher power level in response to which the power transmitter controller 205 may reduce the frequency resulting in a higher power level. If the power receiver continues to request a higher power, the drive signal frequency may reach the peak at 46 kHz with requests still being received for increased power levels. The power transmitter controller 205 may in response proceed to reduce the frequency but rather than move into the non-operating frequency range, the power transmitter controller 205 will proceed to reduce the frequency to 32 kHz with continued requests for increased power leading to gradual frequency reductions until the desired power level is reached. In this way, the power level may be increased from an original 500 W to e.g. 2.0 kW by a continued reduction of the frequency while skipping the non-operating frequency range. Similarly, power may be reduced by continuously increasing the frequency and skipping the non-operating frequency range.

In the approach, power level control may be performed by varying the drive signal frequency over disjoint range such that the frequency is gradually changed within the frequency ranges but jumping over/skipping the non-operating frequency range. For example, a predetermined rate of frequency changes may be used except for when crossing the non-operating frequency range where a sudden change from the end of one operating frequency range to the beginning of the next operating frequency range may be performed.

The approach may provide improved operation and performance in many situations, and in particular for scenarios with complex power transfer/load functions such as those illustrated.

A particular advantage of the described example is for example that it may allow the impedance of the output circuit 103, 303, and thus the load driven by the driver 201, to be an inductive (or possibly resistive, i.e. non-capacitive) load for all frequencies. This may be a substantial advantage in many embodiments as it may facilitate or enable that the output circuit of the driver 201 may operate using a technique known as Zero Voltage Switching (ZVS). For ZVS, the switching of the output transistors are performed when the voltage over the individual transistor is zero. This may substantially reduce the losses in the system and increase the efficiency. However, ZVS requires that the phase angle between the primary current and voltage should be negative, i.e. that the impedance has an inductive reactance. The described approach, and indeed the example of the operating frequency range selections of FIG. 9, may specifically ensure that even for the complex load and power transfer functions, the impedance driven by the driver 201 is always inductive thereby allowing efficient ZVS operation.

In order to operate in inductive mode to achieve efficient ZVS operation, as an example implementation, a standard phase detector could be applied that measures the phase between the inverter voltage and the inverter output current.

In some embodiments, the interval circuit 309 may be arranged to determine the operating frequency ranges such that power transfer load of the output circuit 103, 303 match each other for the transition frequencies of the two operating frequency ranges. Specifically, the frequency ranges may be selected such that the loading of the drive signal caused by the power transfer (possibly including losses) is approximately the same for the upper frequency of the lower operating frequency range and for the lower frequency of the higher operating frequency range.

A match of the transfer power load may be considered to occur when the transfer power loads at the two frequencies meet a match or similarity criterion. The exact criterion may depend on the specific requirements and preferences of the individual embodiment. In many embodiments, a match may by the interval circuit 309 be considered to be present if the power transfer loads for the two frequencies differ by no more than 10%, 5%, 2%, or even 1%.

The matching criterion is in particular not critical if the load is a resistive element. The under or over power will be controlled back to the original power by the power control.

The matching criterion for the power transfer load may be combined with other requirements, such as specifically a requirement for the load to be inductive. For example, the interval circuit 309 may first determine the frequency ranges in which the output circuit load on the drive signal is inductive. For example, the ranges indicated by FIG. 9 may be identified. The interval circuit 309 may then proceed to determine frequencies within these frequency ranges for which the power transfer loads are the same, such as specifically where the power transfer is the same.

Figure 10:
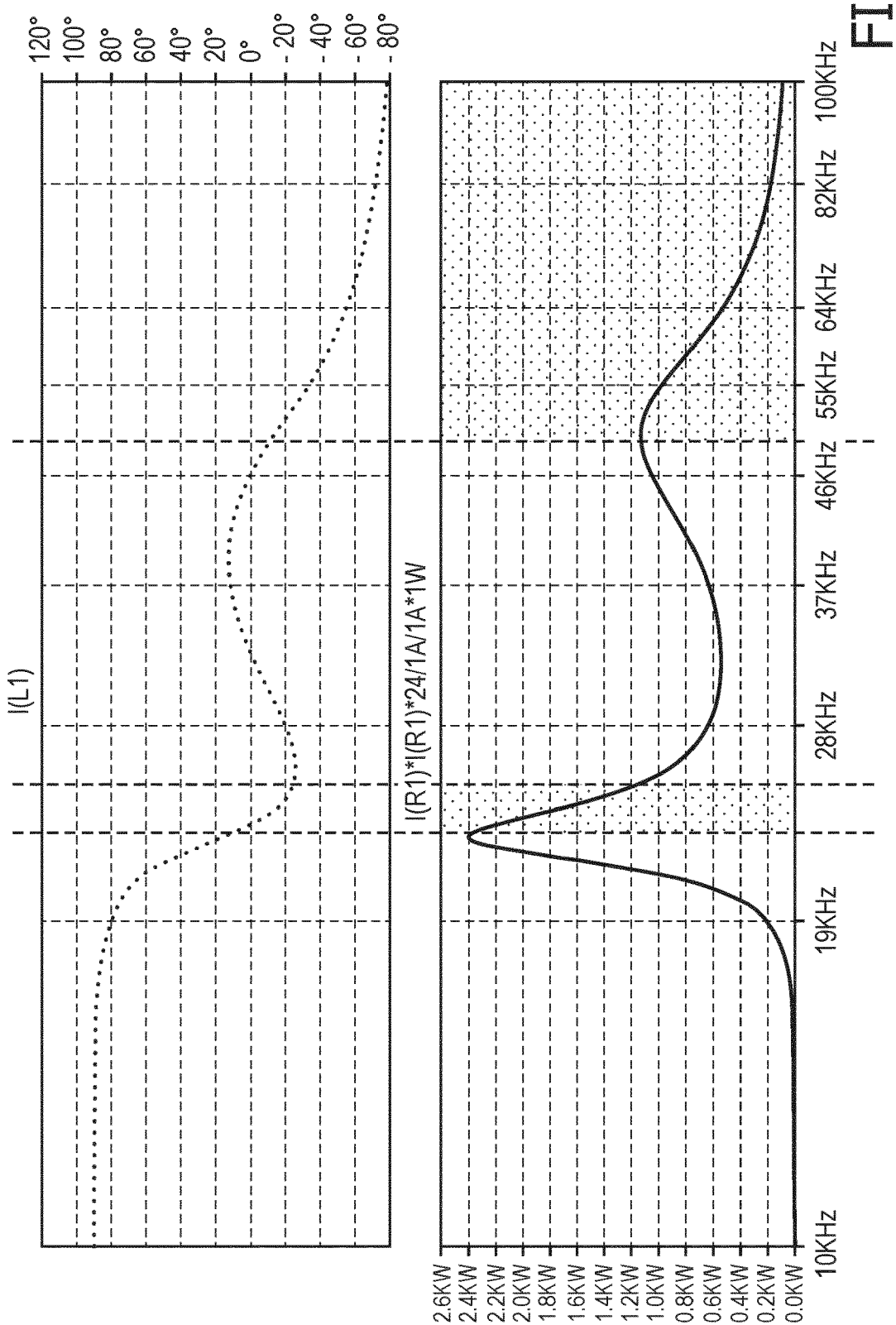
FIG. 10 illustrates in example of load functions for the power transfer system of FIG. 1.

This may for example be achieved by determining the frequency in the lower frequency range for which the power transfer load is the same as the power transfer load for the lowest frequency of the higher frequency range. The lower frequency range may then be set to cover the range from the load becoming inductive, i.e. typically from the first peak frequency, to the frequency for which the power transfer load is the same as for the lowest frequency of the higher frequency range. In this example, the lower frequency range may thus be reduced to match with the upper frequency range. An example of the resulting frequency ranges for the example of FIG. 10.

Figure 11:
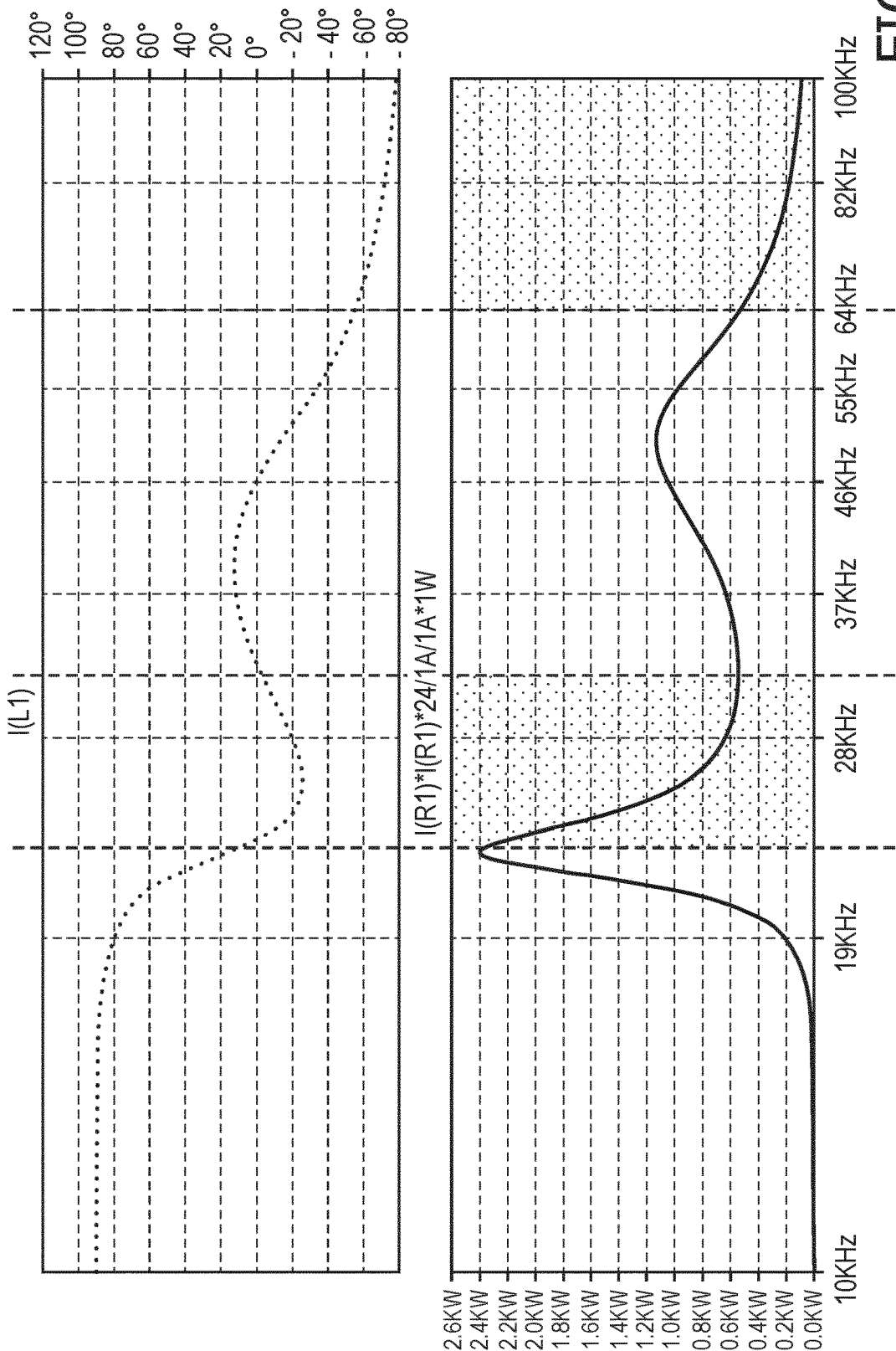
FIG. 11 illustrates in example of load functions for the power transfer system of FIG. 1.

As another example, the interval circuit 309 may be arranged to determine the frequency in the upper frequency range for which the power transfer load is the same as the power transfer load for the highest frequency of the lower frequency range. The higher frequency range may then be set to cover the range from this frequency. In this example, the upper frequency range may thus be reduced to match with the lower frequency range. An example of the resulting frequency ranges for the example of FIG. 11.

In some embodiments, the interval circuit 309 may be arranged to determine the operating frequency ranges, and thus the non-operating frequency range, in response to a gradient of the load function.

For example, the gradient of the phase of the impedance of the output circuit 103, 303 may be determined and the frequencies at which the impedance changes from being capacitive to inductive (or vice versa) may be determined as the frequencies for which the magnitude of the gradient is the largest, i.e. as the extrema of the gradient of the phase offset of the impedance of the output circuit 103, 303. This approach may be based on a consideration that the zero crossings of the phase are typically aligned with the largest phase changes, i.e. with the frequencies for which the gradient is maximum.

In some embodiments the rate of change of the phase vs frequency (dfase/df rate of change) may be monitored, and the frequency jump to another frequency slot/time interval may be determined based on this, such as e.g. when a given threshold is exceeded.

In some embodiments, the interval circuit 309 may be arranged to determine the operating frequency ranges in response to the gradient of the load function for the upper frequency of the lower operating frequency range and a gradient of the load function for the lower frequency of the higher operating frequency range. The interval circuit 309 may be arranged to determine the operating frequency ranges based on the gradients at the transition/end frequencies for the operating frequency ranges, and thus for the frequencies for which the jumps or transitions between the operating frequency ranges occur.

In some embodiments, the interval circuit 309 may for example be arranged to determine the operating frequency ranges such that the gradients at the transition frequencies match as closely as possible, and for example such that they meet a match criterion, such as e.g. that they differ by no more than 10%, 5%, 3%, 2%, or 1%. Such an approach may for example in many embodiments provide improve power control and regulation. For example, it may provide a smoother power regulation with the rate of the power increase being consistent across the drive frequency gap thereby making the jump between these less noticeable.

Figure 12:
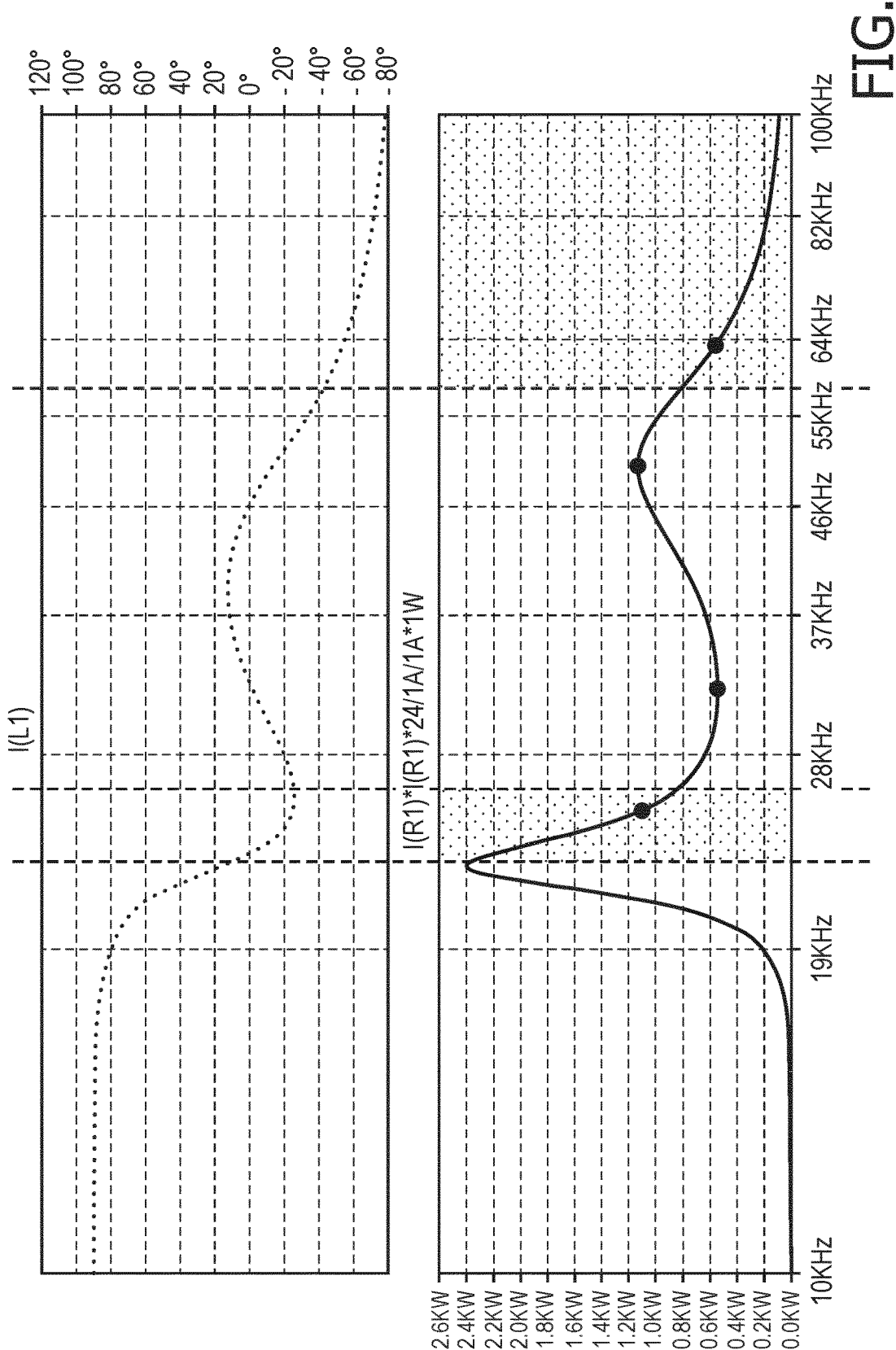
FIG. 12 illustrates in example of load functions for the power transfer system of FIG. 1.

In many embodiments, the determination of the operating frequency range may consider multiple parameters of which the gradient of the load function is one. For example, as previously described, the interval circuit 309 may determine frequencies for which the load of the output circuit 103, 303 is inductive and the power transfer load is the same. However, as can be seen from FIGS. 9-11, these requirements may be met for a range of frequencies including a range for each of the lower and higher operating frequency ranges for which the gain is below the maximum of the second peak and above the minimum gain between the peaks. The interval circuit 309 may then proceed to select the transitions frequencies as the frequencies for which the power transfer loads are the same and within this interval, and for which the gradients are the same, or the difference between them is as small as possible. An example of the resulting frequency ranges is illustrated in FIG. 12. Such an approach may provide particularly efficient and smooth power control in many embodiments.

The approach may for example allow that as the drive frequency is swept from the lower frequency range to the higher frequency range (or vice versa) as part of the power control, the power level may change between a maximum and minimum level in a smooth and continuous manner.

The interval circuit 309 may be arranged to determine the operating frequency ranges such that the load function, and specifically when the load function is or comprises a power transfer or load power function, is monotonic for frequencies of the operating frequency ranges. Specifically, for all frequencies belonging to an operating frequency range, the load power and/or power being transferred, may decrease (or possibly for some frequencies be constant) for increasing frequencies. This monotonic property extends across the operating frequency ranges. In contrast, for frequencies belonging to the non-operating frequency range, the function may be non-monotonic and e.g. as in the examples of FIGS. 9-12, the power level may increase for some frequencies of the non-operating frequency range. In many embodiments, the interval circuit 309 may determine the operating frequency ranges with the constraint that the load function indicates a monotonically decreasing load power level for increasing frequencies of either of the operating frequency ranges.

In the example of FIGS. 1 and 3, the driver 201 is arranged to generate the drive signal to employ a repeating time frame for the drive signal and the power transfer signal during the power transfer phase.

Figure 13:
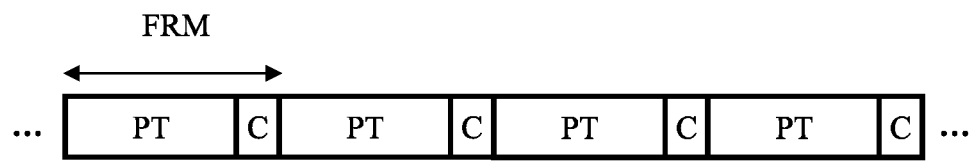
FIG. 13 illustrates an example of a repeating time frame for a power transfer signal.

The repeating time frame comprises at least one power transfer time interval and one communication time interval. An example of such a repeating time frame is illustrated in FIG. 13 where power transfer time intervals are indicated by PT and the communication time intervals are indicated by C. In the example, each time frame FRM comprises only one communication time interval C and one power transfer time interval PT and these (as well as the time frame itself) have substantially the same duration in each frame. However, it will be appreciated that in other embodiments, other time intervals may also be included in a repeating time frame (such as e.g. foreign object detection intervals) or a plurality of communication time intervals and/or power transfer time intervals may be included in each time frame. Furthermore, the duration of the different time intervals (and indeed the time frame itself) may in some embodiments vary dynamically as will be described later.

In the example, power transfer is performed in the power transfer time intervals. The driver is arranged to generate the drive signal and thus the power transfer signal during the power transfer time intervals and specifically a drive signal having a non-zero amplitude/power is generated during the power transfer time intervals. However, during the communication time intervals no (substantial) power transfer signal is generated. Typically, this is achieved by the driver 201 not generating a drive signal (or equivalently the drive signal is controlled to have an amplitude/power of zero or close to zero (e.g. specifically less than an amplitude threshold of 0, 1, 2, 3 or 5, or 10 V and/or a power threshold of less than 1, 2, 3, 5, 10 W or e.g. 1, 2, 3, 5, or 10% of a maximum power for the power transfer).

Using such a repeating time frame, communication and power transfer can be separated in the time domain thereby resulting in substantially reduced (and possibly no) cross-interference from the power transfer to the communication operation. Thus, the interference caused to the communication from the power transfer signal may be substantially reduced and may indeed be reduced to substantially zero. This may vary substantially improve communication performance and reliability thereby leading to improved and more reliable power transfer operation.

In the power transfer phase, the power transmitter is thus arranged to perform power transfer during the power transfer time interval of the time frames. Specifically, during these time intervals, the power transmitter 101 and the power receiver 105 may operate a power control loop. The power control loop may be based on communication within the power transfer time interval or may e.g. be based on communication outside of the power transfer time interval, such as in dedicated communication time intervals. For example, each foreign object time interval may be separated by a plurality of alternating power transfer time intervals and communication time intervals. Thus, the level of the power being transferred may be dynamically varied. In the communication time intervals, the power transfer signal is effectively switched off, but power control error messages for controlling the power loop operations during the power transfer time intervals may be communicated.

In many embodiments, the drive signal and power transfer signal are thus driven to employ a repeating time frame which includes power transfer time intervals (in which power is transferred and the power control loop is typically operated) and reduced power time intervals (in which power is reduced relative to the power transfer time intervals). These reduced power time intervals may typically be used as communication time intervals during which at least some communication is performed (with no or reduced interference from the power transfer). Alternatively or additionally, the reduced power time intervals may be used for foreign object detection, and indeed in many embodiments, reduced power time intervals are used to perform simultaneous communication and foreign object detection.

In many embodiments, the driver 201 may be supplied by a varying power supply signal, and typically by a varying supply voltage. The drive signal may typically be generated to have an amplitude that follows the varying power supply signal and specifically that follows the varying supply voltage. For example, for an output inverter of the driver 201 corresponding to e.g. FIG. 4 or 5, the drive signal will have an amplitude equal to the supply voltage except for a small voltage drop over the switch elements.

For example, in many embodiments, the supply voltage for the driver 201 and output inverter may be generated from a rectified (and possibly partially smoothed) AC mains voltage. For a non-smoothed and rectified voltage, the input supply voltage, and thus the drive signal voltage, will reach a minimum of zero volts at times corresponding to the zero crossings of the mains voltage. For partially smoothed rectified supply voltages, the minimum voltage may occur with a delay relative to the zero crossings and may by higher than zero volts.

In such embodiments, the reduced power/foreign object detection/communication time intervals may be synchronized to the minima in the (absolute) supply signal/voltage. The synchronizer 209 may be arranged to synchronize the communication time interval such that the time of minima of the varying power supply signal fall within the reduced power time intervals, and typically to be centered around these.

In many embodiments, the timing of the reduced power time intervals is such that they are centered around the time of the minima of the varying power supply signal, and thus typically also around the minima of the power transfer signal. In many embodiments, the synchronizer 209 may be arranged to control the timing of the communication time intervals such that they are substantially centered around the zero levels of the input supply voltage (often zero crossings of the input mains voltage).

Figure 14:
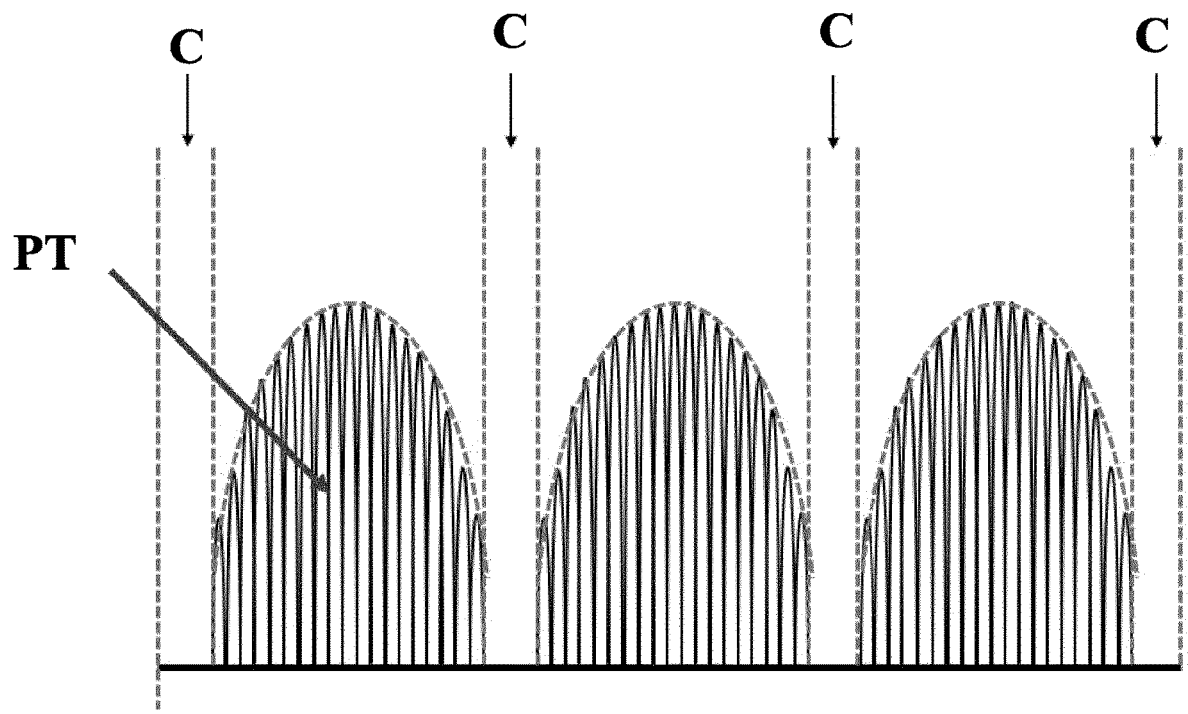
FIG. 14 illustrates an example of a repeating time frame for a power transfer signal.

For example, for the driver 201 being supplied by a rectified mains voltage of 50 Hz, a zero crossing of the mains, and thus a minimum of the rectified supply voltage, occurs at 10 msec intervals, and each repeating time frame may be set to have a duration of 10 msec. An example of the resulting drive signal/power transfer signal is illustrated in FIG. 14 which shows the drive signal/power transfer signal during power transfer time intervals PT and communication/foreign object detection time intervals C.

Figure 15:
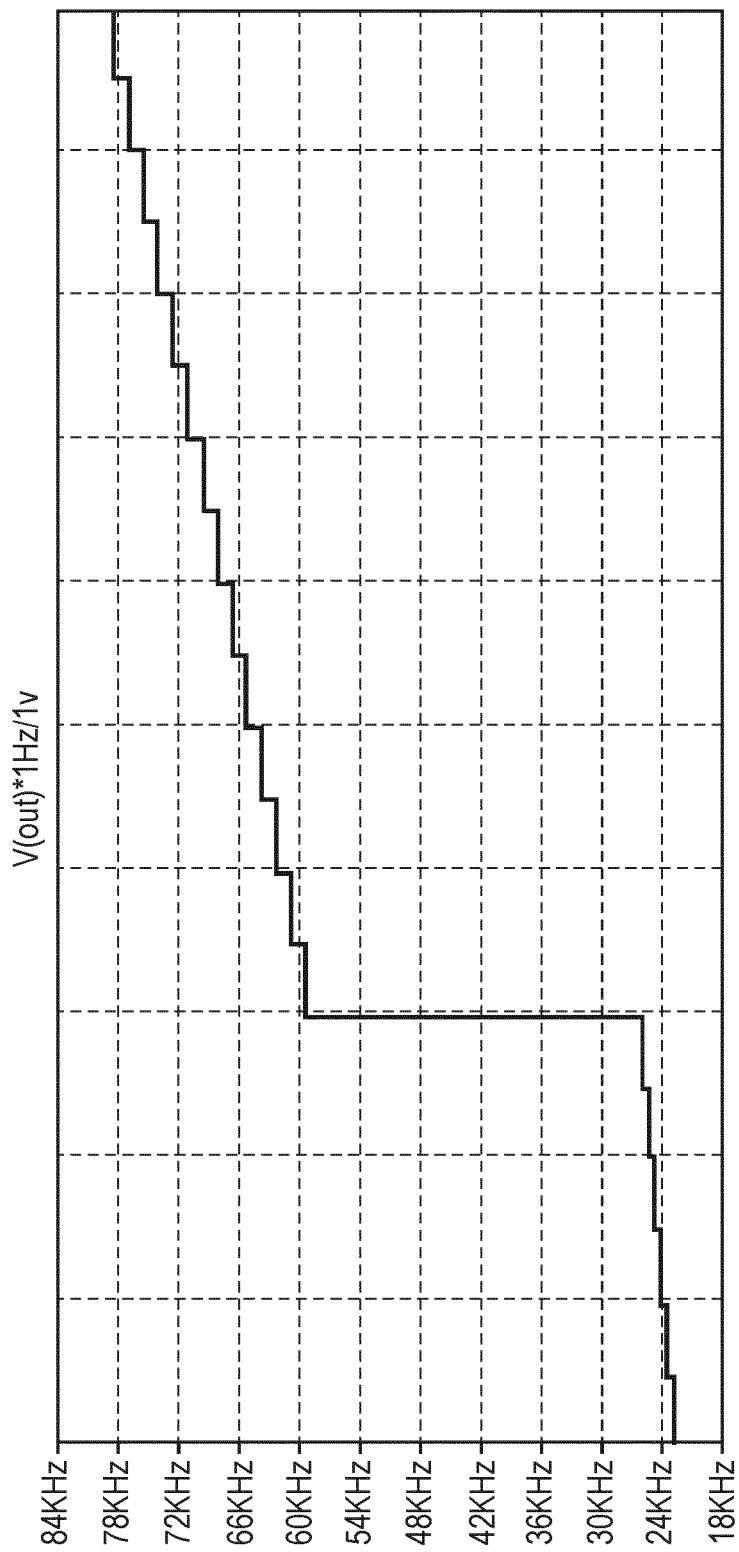
FIG. 15 illustrates an example of a frequency change for a drive signal of the power transmitter of FIG. 4.

In some embodiments using such repeating time frames, the power transmitter controller 205 may be arranged to only change the frequency of the drive signal between power transfer intervals. Thus, in some embodiments, the drive frequency and thus the power level may be changed based on control error messages received from the power receiver but may only change between power transfer intervals and remain constant within each time interval. The change from one frequency range to another may in such cases occur during a reduced power time interval and the approach may reduce transient effects that may otherwise occur for a large frequency step. FIG. 15 illustrates an example of how the frequency may change to reduce power in such an embodiment (in the example the upper frequency of the lower frequency range is 28 kHz and the lower frequency of the higher frequency range is 56 kHz).

The approach may achieve a gradual change without any significant power discontinuities or transient effects as the frequency changes occur at reduce power levels. In the example, during a reduced power time interval, a new frequency for the power signal may be determined with that frequency then remaining stable over the complete power transfer time interval. During the following reduced power time interval, a new frequency is determined and applied. This may ensure that during a power transfer slot the frequency does not suddenly make a jump, which would potentially cause significant transient effects such as increased electromagnetic interference.

In some embodiments, the power transmitter controller 205 may be arranged to change the frequency within power transfer time intervals but only within a frequency range and not between frequency ranges. Thus, in some embodiments, the power transmitter controller 205 may be arranged to only change the frequency of the drive signal either within the lower operating frequency range or within the higher operating frequency range during a power transfer time interval but not between different operating frequency ranges. Thus, in such embodiments, the power control loop may dynamically update the drive signal frequency and thus power level during the individual power transfer time intervals. However, if the power control loop seeks to change the frequency to increase above the upper frequency of the lower frequency range, or to decrease below the lower frequency range, no such change is made until the next reduced power time interval. Thus, smaller frequency variations within the individual operating frequency range are allowed but large frequency steps between the operating frequency ranges are prevented during the power transfer time intervals and are limited to reduced power time intervals during which the power level is low (or indeed substantially zero).

In some embodiments, the transition between the power transfer time intervals and the reduced power time intervals may be made more gradual by the power level being gradually reduced during a power up interval during the start of the power transfer time interval and/or during a power down interval during the end of the power transfer time interval. This may reduce power transients and electromagnetic interface and provide a more efficient operation.

For example, rather than having a constant frequency over the complete reduced power time interval, the beginning and end of the reduced power slots may include a change of the drive signal in order to smooth the power on and off switching for a power transfer time interval. This may achieve an improved spectrum for electromagnetic compatibility.

In many embodiments, the power level may be reduced by reducing a duty cycle of the drive signal during a power up interval at a start of a power transfer time interval and/or by increasing the duty cycle during a power down interval at an end of the power transfer time interval. Thus, by controlling the duty-cycle of the drive signal, a smoother power transient can be achieved at the start and end of the power transfer time intervals without affecting the power control operation based on the drive frequency of the drive signal.

In some embodiments, the power transmitter may include hysteresis in the switching between operating frequency ranges. For example, in some embodiments, when changing from the lower operating frequency range to the higher operating frequency range, the new frequency after the jump may be set to be higher than the lowest frequency of the operating frequency range by a certain suitable value (e.g. 3 kHz higher than the lowest frequency of the higher operating frequency range for some embodiments). Similarly, when changing from the higher operating frequency range to the lower operating frequency range, the new frequency after the jump may be set to be lower than the highest frequency of the operating frequency range by a certain suitable value (e.g. 3 kHz lower than the highest frequency of the lower operating frequency range). Equivalently, the operating frequency range may be considered to have different end frequencies depending on which operating frequency range the drive frequency is currently in).

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", an "first", "second" etc. do not preclude a plurality. Reference signs in the claims are provided merely as a clarifying example shall not be construed as limiting the scope of the claims in any way.

There may be provided:

A power transmitter (101) for wirelessly providing power to a power receiver (105) via an inductive power transfer signal, the power transmitter (101) comprising:
an output circuit (303, 103) comprising a transmitter coil (103) arranged to generate the power transfer signal in response to a drive signal being applied to the output circuit (303, 103);
a driver (301) arranged to generate the drive signal;
a load function circuit (307) arranged to determine a load function for the power transmitter and power receiver arrangement, the load function describing a dependency of a loading of the drive signal by the output circuit (303, 103) on a frequency of the drive signal for the power transmitter and power receiver arrangement;
a power controller (305) for controlling a power level of the power transfer signal by adjusting the frequency of the drive signal;
an interval circuit (309) for determining a first operating frequency range and a second operating frequency range separated by a non-operating frequency range in response to the power transfer function;
wherein the power controller (305) is arranged to adapt the power level of the power transfer signal by varying the frequency of the drive signal over at least frequencies within the first operating frequency range and the second operating frequency range and excluding frequencies within the operating frequency range.

A method of operation for a power transmitter (101) for wirelessly providing power to a power receiver (105) via an inductive power transfer signal, the power transmitter (101) comprising:
an output circuit (303, 103) comprising a transmitter coil (103) arranged to generate the power transfer signal in response to a drive signal being applied to the output circuit (303, 103); and the method comprising:
generating the drive signal;
determining a load function for the power transmitter and power receiver arrangement, the load function describing a dependency of a loading of the drive signal by the output circuit (303, 103) on a frequency of the drive signal for the power transmitter and power receiver arrangement;
controlling a power level of the power transfer signal by adjusting the frequency of the drive signal;
determining a first operating frequency range and a second operating frequency range separated by a non-operating frequency range in response to the power transfer function; wherein controlling the power level comprises adapting the power level of the power transfer signal by varying the frequency of the drive signal over at least frequencies within the first operating frequency range and the second operating frequency range and excluding frequencies within the operating frequency range.

The invention claimed is:

1. A power transmitter comprising:
an output circuit,
   wherein the output circuit is arranged to generate a power transfer signal in response to a drive signal;
a driver circuit,
   wherein the driver circuit is arranged to generate the drive signal;
   wherein the output circuit is arranged to provide a load to the driver circuit;
a load function circuit,
   wherein the load function circuit is arranged to determine a load function for the power transmitter and a power receiver,
   wherein the load function substantially specifies a dependency of the load on a drive frequency,
   wherein the drive frequency is the frequency of the drive signal;
a power controller circuit,
   wherein the power controller circuit is arranged to control a power level of the power transfer signal by adjusting the drive frequency; and
an interval circuit,
   wherein the interval circuit is arranged to determine a first operating frequency range and a second operating frequency range in response to the load function,
   wherein the first operating frequency range and the second operating frequency range are separated by a non-operating frequency range;
   wherein the power controller circuit is arranged to change the power level of the power transfer signal by varying the drive frequency over frequencies within the first operating frequency range and within the second operating frequency range.

2. The power transmitter of claim 1, wherein the interval circuit is arranged to determine the first operating frequency range and the second operating frequency range in response to an impedance of the output circuit as a function of the drive frequency.

3. The power transmitter of claim 2,
   wherein the impedance of the output circuit has an inductive reactance,
   wherein the interval circuit is arranged to determine the first operating frequency range and the second operating frequency range according to the impedance of the output circuit,
   wherein the non-operating operating frequency range comprises frequencies for which the output circuit has a non-inductive impedance.

4. The power transmitter of claim 1,
   wherein the drive is arranged to change the drive frequency from a first frequency in the first operating frequency range to a second frequency in the second frequency range,
   wherein the interval circuit is arranged to determine the first operating frequency range and the second operating frequency range such that the load for the first frequency is substantially the same as the load for the second frequency.

5. The power transmitter of claim 4, wherein the interval circuit is arranged to determine the first operating frequency range and the second operating frequency range in response to a first gradient of the load function for the first frequency of the first operating frequency range and a second gradient of the load function for the second frequency of the second operating frequency range.

6. The power transmitter of claim 1, wherein the interval circuit is arranged to determine the first operating frequency range and the second operating frequency range in response to a load gradient of the load function as a function of the drive frequency.

7. The power transmitter of claim 1, wherein the interval circuit is arranged to determine the first operating frequency range and the second operating frequency range such that the load function is monotonic for frequencies of the first operating frequency range and the second operating frequency range.

8. The power transmitter of claim 7,
   wherein the load function is monotonically decreasing for increasing frequencies of the first operating frequency range,
   wherein the load function is monotonically decreasing for increasing frequencies of the second operating frequency range.

9. The power transmitter of claim 1, wherein the load function circuit is arranged to determine the load function in response to measurements of the drive signal while varying the drive frequency.

10. The power transmitter of claim 9,
    wherein the at least one power transfer intervals comprises a power up interval and a power down interval,
    wherein the power up interval is at a start of the at least one power transfer intervals,
    wherein the power down interval is at an end of the power transfer time interval,
    wherein the power controller circuit is arranged to change the power level by reducing a duty cycle of the drive signal during the least one of a power up interval or during the at least one power down interval.

11. The power transmitter of claim 1,
    wherein the power transfer signal comprises a repeating time frame,
    wherein the repeating time frame comprises at least one power transfer intervals and at least one reduced power intervals,
    wherein the power transfer signal is arranged to transfer power at a first level to the power receiver during the at least one power transfer intervals,
    wherein the power transfer signal is arranged to transfer power at a second power level to the power receiver during the reduced power interval,
    wherein the second power level is less than the first power level, wherein the power controller circuit is arranged to only change the drive frequency outside power transfer intervals.

12. The power transmitter of claim 1,
    wherein the drive signal comprises a drive repeating time frame,
    wherein the power transfer signal comprises a power transfer repeating time frame based on the drive repeating time frame,
    wherein the power transfer repeating time frame comprises at least one power transfer intervals and at least one reduced power intervals,
    wherein the power transfer signal is arranged to transfer power at a first level to the power receiver during the at least one power transfer intervals, wherein the power transfer signal is arranged to transfer power at a second power level to the power receiver during the reduced power interval,
wherein the second power level is less than the first power level, wherein the power controller circuit is arranged to only change the drive frequency either within the first operating frequency range and within the second operating frequency range during the at least one power transfer interval.

13. The power transmitter of claim 1, wherein the drive frequency is not within the non-operating frequency range.

14. A method comprising:
generating a power transfer signal in response to a drive signal;
generating the drive signal;
determining a load function for the power transmitter and a power receiver,
wherein the load function substantially specifies a dependency of a load driven by the drive signal on a drive frequency,
wherein the drive frequency is the frequency of the drive signal;
controlling a power level of the power transfer signal by adjusting the drive frequency; and
determining a first operating frequency range and a second operating frequency range in response to the load function,
wherein the first operating frequency range and the second operating frequency range are separated by a non-operating frequency range;
wherein controlling the power level comprises changing the power level of the power transfer signal by varying the drive frequency over at least frequencies within the first operating frequency range and within the second operating frequency range.

15. The method of claim 14, wherein the drive frequency is not within the non-operating frequency range.

16. The method of claim 14, wherein the determining of the first operating frequency range and the second operating frequency range in response to an impedance of an output circuit as a function of the drive frequency.

17. The method of claim 16,
wherein the impedance of the output circuit has an inductive reactance,
wherein the determining of the first operating frequency range and the second operating frequency range according to the impedance of the output circuit,
wherein the non-operating operating frequency range comprises frequencies for which the output circuit has a non-inductive impedance.

18. The method of claim 14,
wherein the drive is arranged to change the drive frequency from a first frequency in the first operating frequency range to a second frequency in the second frequency range,
wherein the determining of the first operating frequency range and the second operating frequency range such that the load for the first frequency is the same as the load for the second frequency.

19. The method of claim 18, wherein the determining of the first operating frequency range and the second operating frequency range in response to a first gradient of the load function for the first frequency of the first operating frequency range and a second gradient of the load function for the second frequency of the second operating frequency range.

20. The method of claim 14, wherein the determining of the first operating frequency range and the second operating frequency range in response to a load gradient of the load function as a function of the drive frequency.

21. A computer program stored on a non-transitory medium, wherein the computer program when executed on a processor performs the method as claimed in claim 14.

* * * * *